(12) United States Patent
Malhotra

(10) Patent No.: US 7,097,930 B2
(45) Date of Patent: Aug. 29, 2006

(54) CARBON DIOXIDE MANAGEMENT IN A DIRECT METHANOL FUEL CELL SYSTEM

(75) Inventor: Sanjiv Malhotra, Castro Valley, CA (US)

(73) Assignee: Oorja Protonics, Menlo Park, CA (US)

( * ) Notice: Subject to any disclaimer, the term of this patent is extended or adjusted under 35 U.S.C. 154(b) by 106 days.

(21) Appl. No.: 10/862,099

(22) Filed: Jun. 4, 2004

(65) Prior Publication Data
US 2005/0003256 A1    Jan. 6, 2005

Related U.S. Application Data

(60) Provisional application No. 60/480,148, filed on Jun. 20, 2003.

(51) Int. Cl.
    *H01M 2/14*    (2006.01)
(52) U.S. Cl. .............. 429/38; 429/39; 429/32; 429/34
(58) Field of Classification Search ........ 429/17, 429/19, 32, 34, 38, 39; 95/51, 55; 96/55, 96/58
    See application file for complete search history.

(56) References Cited

U.S. PATENT DOCUMENTS

| | | | |
|---|---|---|---|
| 5,795,668 A | 8/1998 | Banerjee | 429/33 |
| 6,332,913 B1 * | 12/2001 | Breitschwerdt et al. | 95/55 |
| 6,460,733 B1 | 10/2002 | Acker et al. | 222/94 |
| 6,492,052 B1 | 12/2002 | Ren | 429/33 |
| 6,544,677 B1 | 4/2003 | Matejcek | 429/20 |
| 6,565,998 B1 | 5/2003 | Matejcek et al. | 429/22 |
| 6,579,331 B1 | 6/2003 | Ho | 48/198.3 |
| 6,589,679 B1 | 7/2003 | Acker et al. | 429/22 |
| 6,635,103 B1 | 10/2003 | Sirkar et al. | 95/44 |
| 6,821,658 B1 * | 11/2004 | Acker et al. | 429/13 |
| 2002/0102451 A1 | 8/2002 | Acker et al. | 429/33 |
| 2002/0106542 A1 | 8/2002 | Matejcek et al. | 429/22 |
| 2002/0127451 A1 | 9/2002 | Cao et al. | 429/30 |
| 2003/0003341 A1 | 1/2003 | Kinkelaar et al. | 429/34 |
| 2003/0157395 A1 | 8/2003 | Ren et al. | 429/44 |
| 2003/0157396 A1 | 8/2003 | Beckmann et al. | 429/44 |
| 2003/0170524 A1 | 9/2003 | Kordesch et al. | 429/34 |
| 2004/0001991 A1 | 1/2004 | Kinkelaar at el. | 429/38 |

* cited by examiner

*Primary Examiner*—Bruce F. Bell
(74) *Attorney, Agent, or Firm*—Lumen Intellectual Property Services, Inc.

(57) ABSTRACT

A compact carbon dioxide separation module for a direct methanol fuel cell (DMFC) is provided. The module is a set of plates, typically two plates, sandwiched together and enclosing a membrane permeable to carbon dioxide. The anode output stream of the DMFC stack feeds into one of the plates. The other plate has an exit hole to vent carbon dioxide permeated through the membrane. As such the module does not draw any power; hence the module will improve the overall efficiency of a DMFC system. In addition, the module is small in size and can easily be stacked and integrated with a DMFC stack. From a DMFC system perspective the module could also be nicely integrated and stacked with a mixing device/module, a water management device/module and a methanol source.

11 Claims, 9 Drawing Sheets

CARBON DIOXIDE MANAGEMENT IN A DIRECT METHANOL FUEL CELL SYSTEM

CROSS-REFERENCE TO RELATED APPLICATIONS

This application is cross-referenced to and claims priority from U.S. Provisional Application 60/480,148 filed Jun. 20, 2003, which is hereby incorporated by reference.

FIELD OF THE INVENTION

The present invention relates generally to direct methanol fuel cells. More particularly, the present invention relates to carbon dioxide management in direct methanol fuel cells.

BACKGROUND

A direct methanol fuel cell (DMFC), like an ordinary battery, provides dc electricity from two electrochemical reactions. These reactions occur at electrodes to which reactants are continuously fed. The negative electrode (anode) is maintained by supplying a fuel such as methanol, whereas the positive electrode (cathode) is maintained by the supply of oxygen or air. When providing current, methanol is electrochemically oxidized at the anode electro-catalyst to produce electrons, which travel through the external circuit to the cathode electro-catalyst where they are consumed together with oxygen in a reduction reaction. The circuit is maintained within the cell by the conduction of protons in the electrolyte.

A direct methanol fuel cell system integrates a direct methanol fuel cell stack with different subsystems for instance for the management of water, fuel, air, humidification and thermal condition of the system. These subsystems are aimed to improve the overall efficiency of the system, which typically suffers from kinetic constraints within both electrode reactions together with the components of the cell stack. For instance, one issue with traditional DMFC systems relates to the separation of carbon dioxide from the anode exhaust stream. Carbon dioxide is typically separated prior to re-circulating the liquid mixture (methanol and water) back to the fuel cell stack inlet and is implemented by means of a gas/liquid separator system. In this traditional approach, the methanol and water vapor are first condensed by means of a cooling fan (or radiator) and the carbon dioxide gas thus separated from the liquid (methanol and water) is vented out. The recovered liquid methanol and water are then pumped by means of a re-circulating pump to a mixing tank where they are mixed with fresh methanol prior to being fed to the fuel cell stack. The fresh methanol is diluted with the recovered methanol and water to achieve a desired concentration prior to feeding it to the stack. The traditional process of separation of carbon dioxide from the methanol and water mixture is power consuming, requires bulky equipment and quite inefficient since some of the methanol and water present in a vapor form in the anode exhaust stream are lost along with the carbon dioxide. Accordingly, there is a need to develop new subsystems in particular related to carbon dioxide separation that could be integrated with a direct methanol fuel cell and system.

SUMMARY OF THE INVENTION

The present invention is a novel and elegant solution of a compact carbon dioxide separation module for a direct methanol fuel cell (DMFC). The apparatus provided by this invention is based on a more natural solution and avoids bulky and power consuming devices. In contrast to traditional solutions, the presently proposed module by itself does not draw any power; hence the module will improve the overall efficiency of a DMFC system. In addition, the module is small in size and can easily be stacked and integrated with a DMFC stack or system. The individual size of the carbon dioxide module is typically about 27 cubic inches or less.

The carbon dioxide separation apparatus or module is a set of plates, typically two plates, sandwiched together and enclosing a membrane permeable to carbon dioxide. The anode output stream of a DMFC stack feeds into one of the plates. The other plate has an exit hole to vent carbon dioxide permeated through the membrane. The membrane is substantially restrictive to other gases than carbon dioxide present in the anode output stream or substantially restrictive to liquids present in the anode output stream.

More specifically, the first plate and the second plate each have a flow field at the site facing and in contact with the membrane. In other words, the membrane is a barrier between the flow fields. In one embodiment, the flow field of the first plate has an access hole at one end and an exit hole at another end. The access hole provides access for the anode output stream of the direct methanol fuel cell system, which is the anode output stream with at least carbon dioxide, unused methanol and unused water. The exit hole provides output for the anode output stream substantially including unused methanol and unused water. The flow field of the second plate has an exit hole to vent carbon dioxide that permeated through said membrane. In one embodiment a venting fan is included with the module to promote the exhaust of carbon dioxide; such a fan does draw power however this could be relatively small.

From a DMFC system perspective the carbon dioxide separation module could be nicely integrated and stacked with a mixing device/module, a water management device/module and a methanol source. Each of the other modules could also be based on a set of plates and stacked together with the DMFC stack and carbon dioxide module as a compact multi-module DMFC system. The mixing device could have a first input hole connected to the exit hole of the first plate, a second input hole for input from the water management device, a third input hole for input from the methanol source, and an output hole to output a mixture of the three inputs. The mixture created in the mixing device could then flow to the anode inlet of a DMFC stack.

In such a DMFC system, the integration of the carbon dioxide separation device could be further enhanced by using special holes. For instance, the exit hole of the first plate could be connected to the mixing device via a through-hole through the second plate. The integration with other plates or devices could also be accomplished via through-holes either through the first plate and/or the second plate to, for instance, connect the cathode output stream of a DMC stack to a water management device.

BRIEF DESCRIPTION OF THE FIGURES

The present invention together with its objectives and advantages will be understood by reading the following summary in conjunction with the drawings, in which.

DETAILED DESCRIPTION OF THE INVENTION

Figure 1:
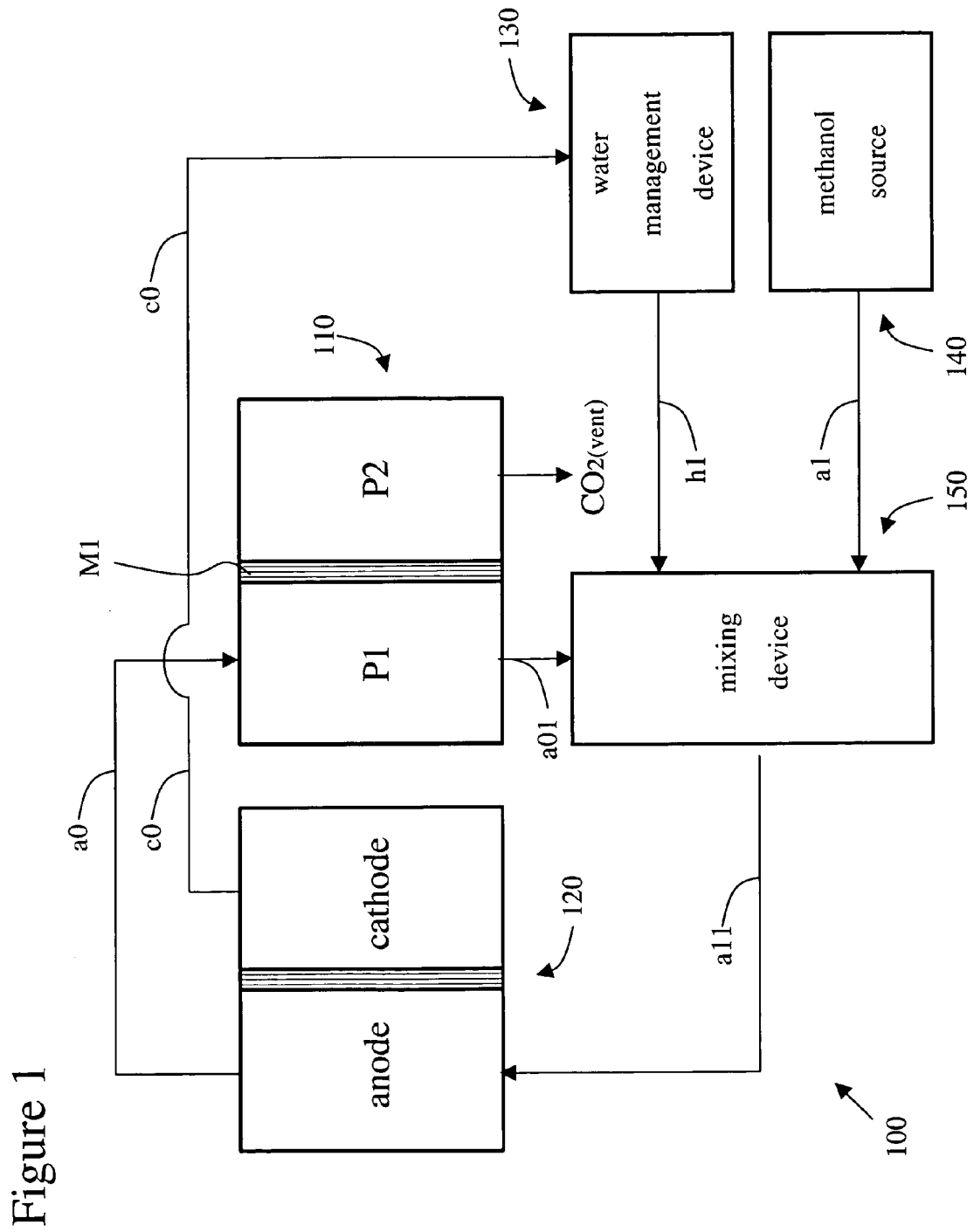
FIG. 1 shows an exemplary embodiment of a carbon dioxide separation device as part of a DMFC system according to the present invention.
Figure 2:
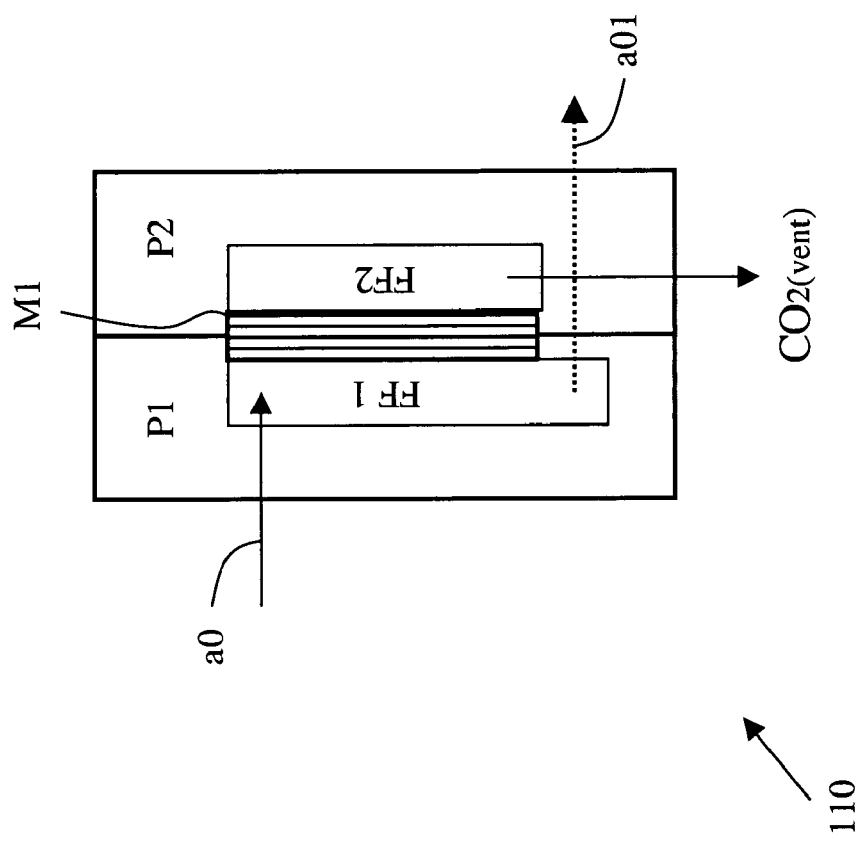
FIGS. 2–3 show exemplary embodiments of a carbon dioxide module with plates, a membrane, holes and flow streams according to the present invention.
Figure 3:
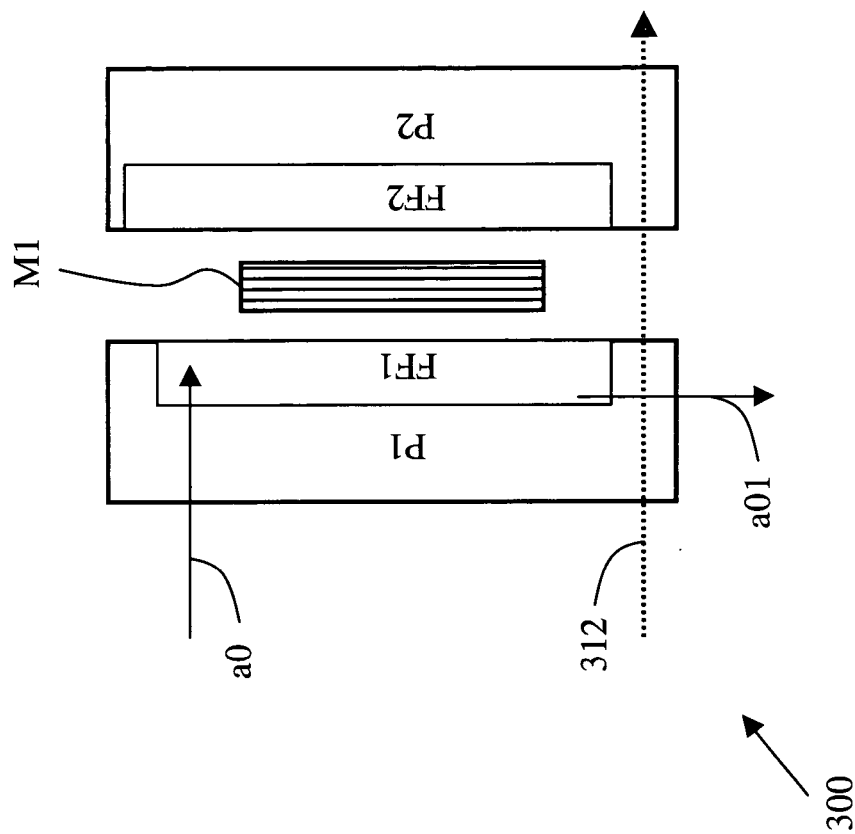

FIG. 1 shows an overview of a direct methanol fuel cell system 100 with a carbon dioxide separation device 110. System 100 further includes a direct methanol fuel cell stack 120, and preferably a water management device 130, a methanol source 140 and/or a mixing device 150. Carbon dioxide separation device 110 is a set of plates, typically two plates P1 and P2, sandwiched together. Plates P1 and P2 enclose a membrane M1 that is permeable to carbon dioxide (i.e. substantially selective only to carbon dioxide and not to other gases or liquids). Each plate P1 and P2 also has a flow field FF1, FF2 respectively as shown in FIG. 2. Each flow field faces and is in contact with the membrane M1. In other words, membrane M1 is a barrier between flow field FF1 and flow field FF2.

The flow field F1 of plate P1 receives an anode output stream a0 of direct methanol fuel cell stack 120. This anode output a0 stream typically contains carbon dioxide, unused methanol and unused water. The carbon dioxide present in stream a0 is produced as a result of the electrochemical oxidation reaction occurring at the anode. The temperature of the stream a0 is around the temperature of the direct methanol fuel cell stack (+/−2 degrees Celsius) and therefore stream aO is responsible for carrying a significant amount of heat generated at the stack.

The key idea of membrane M1 is that is it permeable to carbon dioxide, substantially restrictive to other gases than carbon dioxide and substantially restrictive to liquids present in the anode output stream a0. The driving force for carbon dioxide permeation through the membrane M1 is the difference in the partial pressures of carbon dioxide across membrane M1, i.e. the carbon dioxide partial pressure in plate P11 is higher than in plate P12. In one embodiment, the membrane may require a pressure differential of around 0.1 to 0.5 psig, however, the present invention is not limited to this pressure range and could be in any range as long as the carbon dioxide passage and extraction occurs.

Examples of suitable membranes include hybrid membranes of polymer and ceramics as well as hydrophobic microporous membranes. The idea behind using a hybrid membrane is to have a membrane that would not only have a higher permeability for carbon dioxide but also have a high selectivity towards carbon dioxide, which is shown by quite a few hybrid membranes prepared by a combination of sol-gel reaction and polymerization. Examples of suitable membranes are for instance, but not limited to, diphenyldimethoxysilane (DPMOS), trimethoxysilane (TMOS), phenyltrimethoxysilane (PTMOS), poly(amide-6-b-ethyleneoxide) and silica, aminopropyltrimethoxysilane (APrTMOS), silica-polyimide on alumina, or the like. A typical flux of carbon dioxide of these kinds of membranes is in the range of $10^{-6}$ to $10^{-7}$ mol/m$^2$-sec-Pa. A person of average skill in the art would appreciate that other kinds of membranes could have a different flux range, which would still be within the scope of this invention.

The anode output stream a0 flows through flow field FF1, whereby the carbon dioxide permeates through membrane M1. At the other end of flow field FF1 the original anode output stream is left with unused methanol and unused water, i.e. substantially without carbon dioxide. The unused methanol and unused water exits from flow field FF1 as output a01. Output a01 could be used in a mixing device where it could be mixed with methanol fuel from methanol source 140 and recovered water from water management device 130. This mixture from mixing device 150 could then be used as an anode input stream a11 to direct methanol fuel cell stack 120. At the other flow field FF2 of carbon dioxide device 110 the permeated carbon dioxide is collected and vents from flow field FF2 through an exit hole as $CO_2$ (vent) to the open air.

The plates for the carbon dioxide device could be constructed from a variety of materials such as metal, stainless steel, graphite or any other thermally conductive material with sufficient tensile strength. The flow fields of the plates could be established by grooves etched or machined on its face for fluid flow as discussed supra. Methods to construct such plates and flow fields are known in the art.

Figure 5:
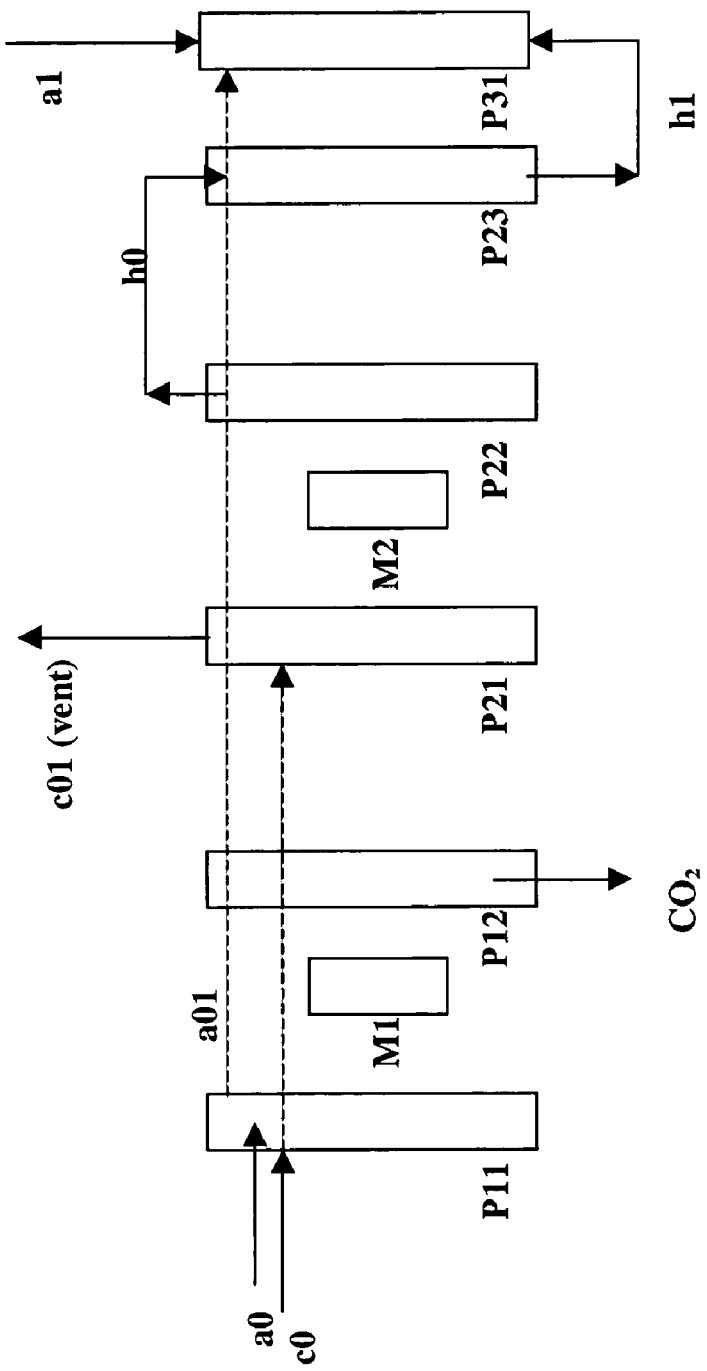
FIG. 5 shows a design architecture of a compact multi-functional module (CMM) according to example 1 in FIG. 4.
Figure 7:
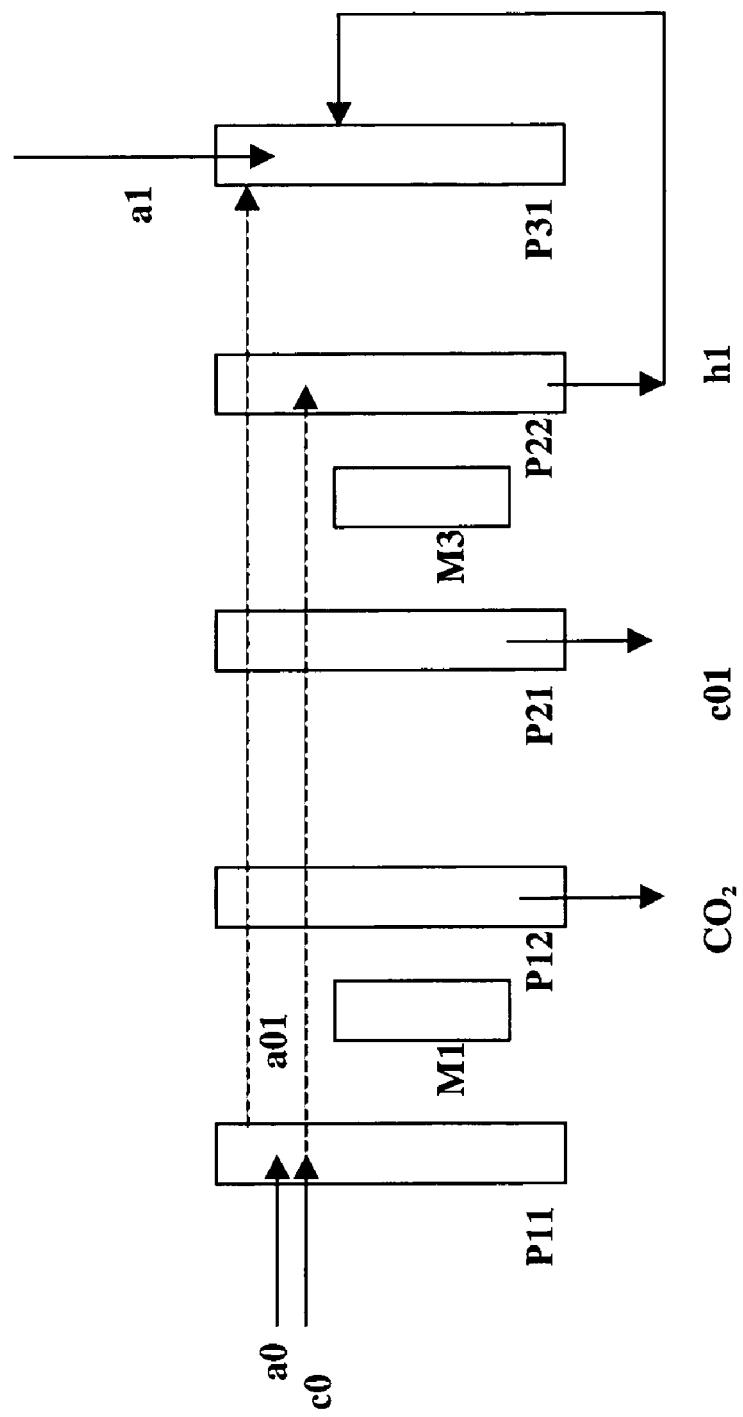
FIG. 7 shows a design architecture of a compact multi-functional module (CMM) according to example 2 in FIG. 6.
Figure 9:
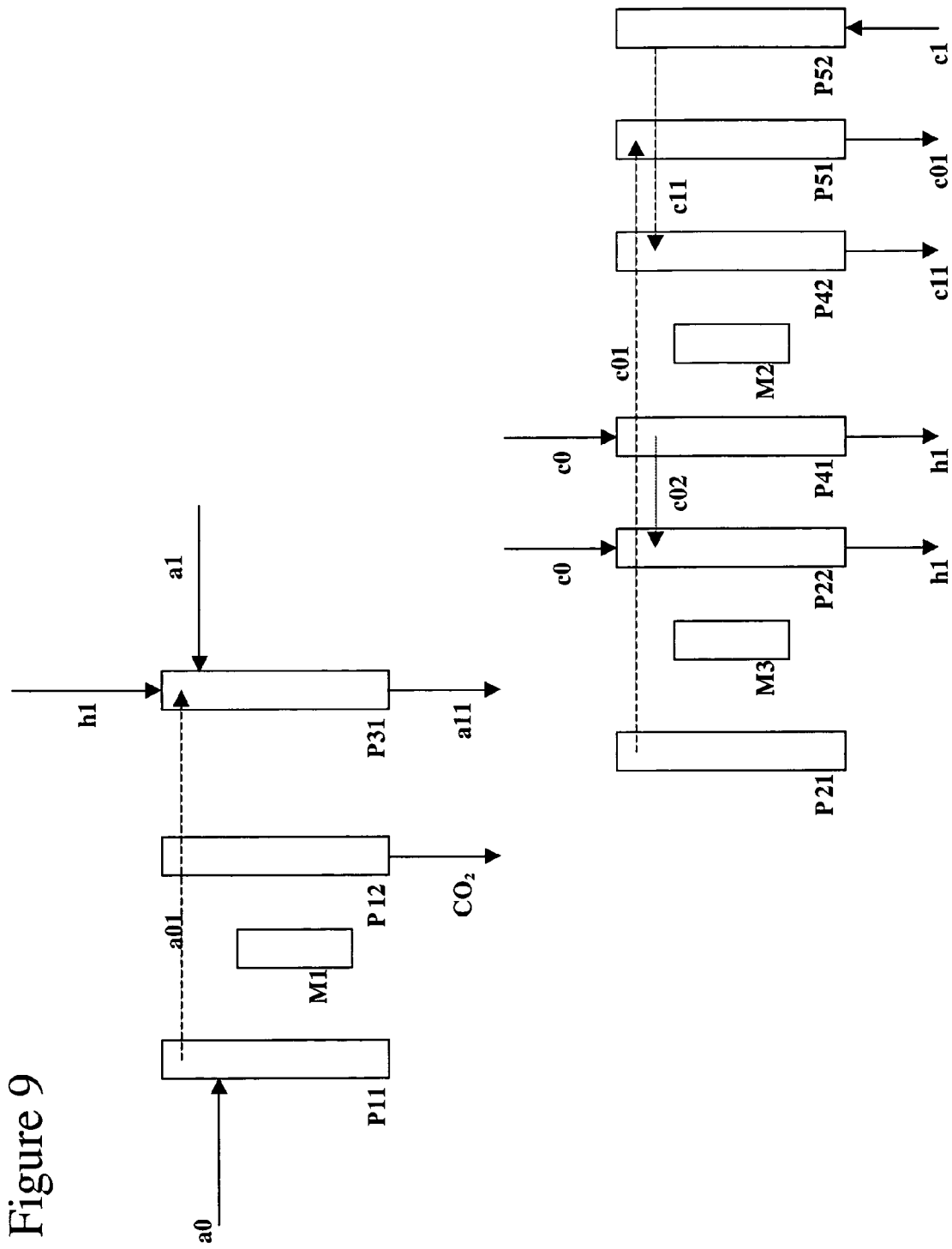
FIG. 9 shows a design architecture of a compact multi-functional module (CMM) according to example 3 in FIG. 8.

The plates, flow fields, or plates and flow fields require holes for entry of a stream (access holes), for passage of stream from one plate to the another (through holes) and for exiting of a stream (exit holes). An access hole is used for anode input stream a0. This access hole goes through plate P1 allows a0 to get to flow field FF1 of plate P1 as shown in FIG. 2. An example of an exit hole is one originating from flow field FF1 of plate P1 for output stream a01. In one embodiment output stream could be directed to mixing device 150 as shown in FIG. 1. In another embodiment, this exit hole could pass through one or more plates, e.g. plate P2 as shown in FIG. 2 or multiple plates as shown in FIGS. 5, 7 and 9. In yet another embodiment, each plate P1, P2 could have through holes (indicated by line 312 passing through the plates) to allow a particular stream to by-pass plates P1, P2. In a direct methanol fuel cell system with a plurality of plates that are stacked together it makes sense to have cathode output stream go through plates P1, P2 to access another plate in the stack as discussed infra.

In a preferred embodiment plates P1, P2 are stacked as a compact module, creating a compact carbon dioxide module. In one example, the size of such a compact carbon dioxide module could be about 9"×6"×½" (about 27 cubic inches). In this example each plate could then have a thickness of about ¼". In general, the individual measurement could vary, but the volume of the carbon dioxide module would still typically be lower than about 30 cubic inches, and more preferably equal or lower than about 27 cubic inches. A person of average skill in the art would readily appreciate that currently available techniques make it possible to manufacture much smaller modules than 27 cubic inches, all of which are part of the scope of the invention.

In another embodiment, such a compact carbon dioxide module is stacked with the direct methanol fuel cell stack, creating a compact multi module (CMM). In yet another embodiment, the water management device and mixing device are constructed with plates therewith additionally creating compact modules. All together these compact module of the fuel cell stack, carbon dioxide separation water management and mixing could create another CMM. The following description includes different examples of how the carbon dioxide separation device/module could be integrated in a direct methanol fuel cell system. This system could include an air supply system, a water management device/module, a mixing device/module and a methanol source.

EXAMPLE 1

Figure 4:
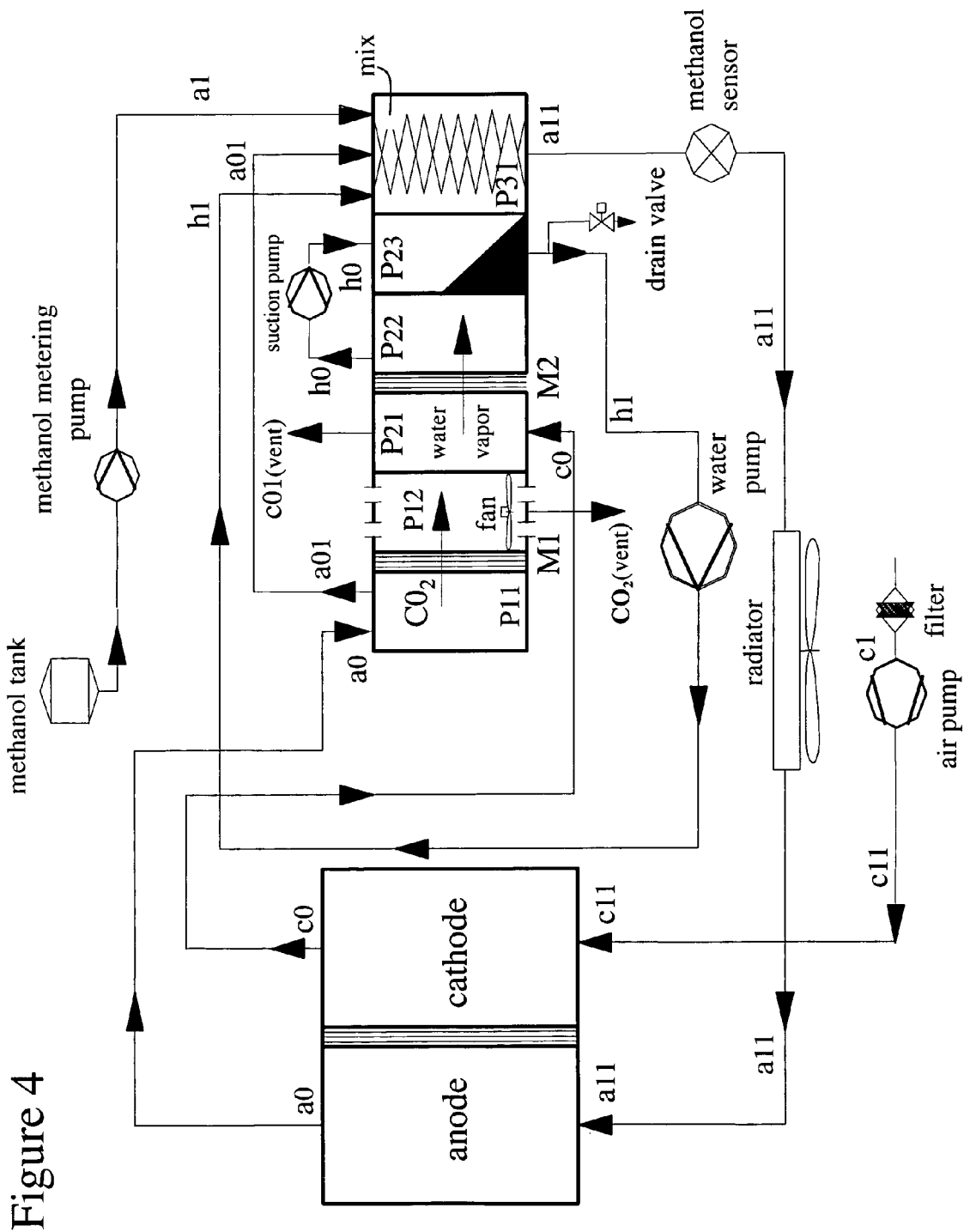
FIG. 4 shows example 1 of a DMFC system according to the present invention.

FIGS. 4–5 show an example of an approach for implementing the critical functions of water recovery from the cathode exhaust, carbon dioxide separation from the anode output stream, dilution of incoming concentrated methanol and thermal management in a direct methanol fuel cell. The individual components or modules are described without a particular preference in order. In addition, the description of the carbon dioxide separation device/module is not repeated infra and readers are referred to the description supra.

1.1 Air Supply

An air supply subsystem is added to provide the oxygen c11 to the cathode(s) to satisfy the electrochemical demand in a direct methanol fuel cell stack. The stack has an oxygen requirement in addition to the oxygen consumed by the electrochemical current producing reaction. Methanol being a small, completely water miscible molecule has a tendency to migrate from the anode side (fuel side) over to the cathode side (air side) of the cells. This crossover methanol burns on the cathode catalyst producing an additional oxygen demand, additional waste heat, and additional water in the stack. The function of the air supply subsystem is multifold, i.e. (i) to provide oxygen to the cathode(s), (ii) control the water level in the stack by removing the water produced by the fuel cell reaction and crossover, and (iii) remove waste heat from the stack.

Air c11 at ambient conditions is fed by means of an air pump to the cathode of the direct methanol fuel cell stack. The air could have first passed through an air filter before feeding into the air pump. C11 provides oxygen for the electrochemical reduction reaction occurring at the cathode as well as for the reaction with any methanol crossing over to the cathode across the membrane. The unused air saturated with water vapor and some liquid water exits the direct methanol fuel cell stack as cathode output stream c0, typically at temperatures around the operating temperature of the stack. The temperature of the direct methanol fuel cell stack can range anywhere from 40 degrees Celsius to 80 degrees Celsius. The water vapor and liquid water present at the cathode side of the direct methanol fuel cell stack are a result of both the water producing oxygen reduction reaction occurring at the cathode as well as due to the water crossover from the anode side to the cathode across the membrane electrolyte.

1.2 Water Management

The function of the module with plates P21, P22 and P23 and membrane M2 is to separate and recover water from air in the cathode exhaust stream c0 utilizing membrane M2. In light of this invention this module is referred to a water management device (see also FIG. 1).

The cathode output stream c0 of direct methanol fuel cell stack enters and flows through a flow field of plate P21 (e.g. grooves etched or machined on the inside face of plate P21) where c0 is in contact with an air dehydration membrane M2. Membrane M2 performs two functions:

(i) M2 is a selective air dehydration membrane permitting only water vapor to pass through it and restricting the flow of air or liquid water in c0 to pass through it. In one embodiment, a small low power suction pump could be used to create a vacuum or a low pressure differential across the membrane M2 to facilitate the selective transport of water vapor; and (ii) M2 acts as a barrier between plates P21 and P22.

Examples of air dehydration membranes suitable as M2 are for instance, but not limited to, Cactus™ (PRISM™) membrane available from Air Products and Chemicals or an air dehydration membrane available from Balston Inc. or Parker Hannifin. These membranes typically have a flux for water vapor as defined by the following equation developed by Air Products Inc.:

$$N_{WV} = P_i/L = (300 \text{ to } 1500) \; 10^{-6} \text{ cm}^3/\text{cm}^2 \cdot \text{s} \cdot \text{cmHg}$$

where $N_{WV}$ is the flux of water vapor through the membrane, $P_i$ is the permeability of water vapor through the membrane, and L is the thickness of the membrane.

At plate P21, air in stream c0 is vented out. The idea behind extracting water vapor from c0 is to provide an adequate supply of liquid water for dilution of the pure methanol from the methanol reservoir on the fuel (anode) side. The water vapor in c0 that passed through membrane M2 to plate P22 exits as h0 and then to plate P23. The water vapor in stream h0 condenses to liquid water due to the phenomena of over-saturation in plate P23; the separation of air from the water vapor leads to an increase in the vapor pressure of water vapor thus leading to condensation of water vapor in plate P23. The liquid water thus produced is then pumped by means of a water pump from P23 as stream h1, i.e. the water condensate stream.

1.3 Mixing Device

Plate P31 is an example of a mixing device, which has a reservoir accessible by three inputs. The first input is stream a01 from the carbon dioxide separation module, which enters plate P31. The second input is stream h1 from plate P23 that is fed into plate P31 by means of a water pump as described supra. Additionally, the third input is a stream of fresh methanol or neat methanol namely a1 fed from a methanol tank by means of a metering pump into plate P31. Plate P31 is a passive mixing device or a compartment where h1, a01 and a1 are mixed with the purpose of diluting the incoming neat methanol stream a1 prior to its being fed into the anode side of the stack as a11. Plate P31 is also used for another function, i.e. thermal management since stream a01 is the primary carrier of heat generated at the anode. A majority of this heat is used to thermally condition or raise the temperature of methanol stream a1, since this is typically at room temperature. This process ensures that the temperature of the stream a11 exiting from plate P31 is close to that of the temperature of the direct methanol fuel cell stack. If necessary, one could add a small radiator fan for cooling stream a11.

1.4 Compact Multi-functional Module

FIG. 5 shows an example of constructing a compact multi-functional module system for a direct methanol fuel cell system. This design includes various plates, membranes and holes, such as:

1. Plate P11 with an access hole for a0.
2. Plate P11 and plate P12 with a through hole to allow the passage of c0.

3. Plate P11 with an exit hole for a01.
4. Plates P12, P21, P22 and P23 with a through hole to allow the passage of a01.
5. Plate P12 with an exit for carbon dioxide ($CO_2$).
6. Plate P21 with an access hole for c0.
7. Plate P21 with an exit hole for c01.
8. Plate P22 with an exit hole for h0.
9. Plate P23 with an access hole for h0.
10. Plate P23 with an exit hole for h1.
11. Plate P31 with an access hole for a01, h1 and a1.
12. Plate P31 with an exit hole for a11.
13. Plate P11 with a flow field (e.g. grooved inside face) for flow of a0 and a01.
14. Plates P12 with a flow field (e.g. grooved inside face) for flow of carbon dioxide ($CO_2$).
15. Plate P21 with a flow field (e.g. grooved inside face) for flow of c0 and c01.
16. Plate P22 with a flow field (e.g. grooved inside face) for flow of h0.

EXAMPLE 2

Figure 6:
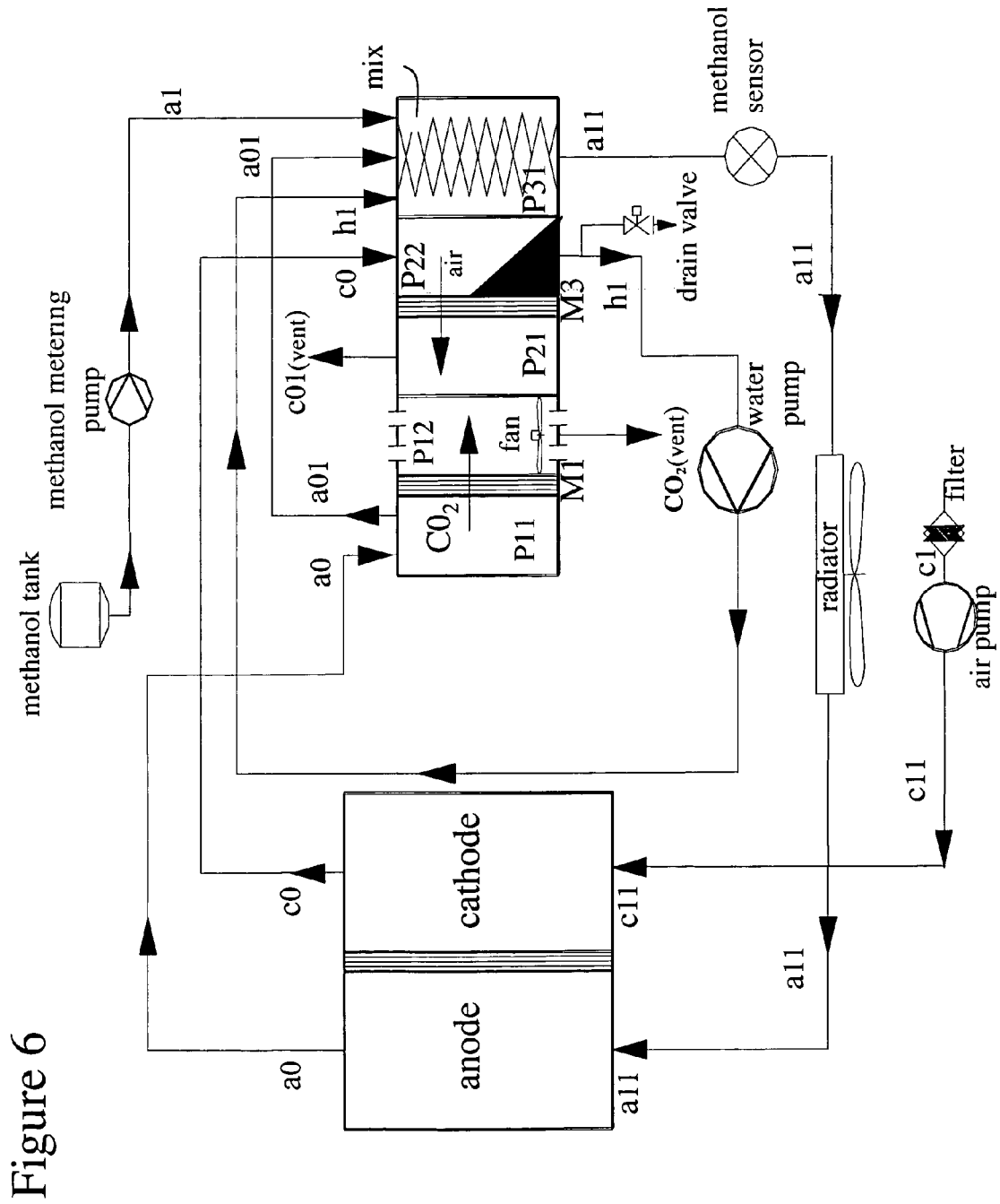
FIG. 6 shows example 2 of DMFC system according to the present invention.

FIGS. 6–7 show another example of an approach for implementing the critical functions of water recovery from the cathode exhaust, carbon dioxide separation from the anode output stream, dilution of incoming concentrated methanol and thermal management in a direct methanol fuel cell. This example is a variation of example 1 with the difference in the recovery of water related to the water management device/module. For a description of the other components or modules the reader is referred to the description supra.

2.1 Water Management

In this embodiment, cathode output stream c0 enters the flow field of plate P22 (e.g. through grooves etched or machined on the inside face of plate P22) where c0 is in contact with membrane M3. Membrane M3 performs two functions namely:
   (i) Membrane M3 is a selective permeable membrane that permits only air to pass through it and restricts the transport of any water vapor or liquid water through it (this in contrast to membrane M2 described with respect to FIGS. 4–5). A pressure differential across membrane M3 is responsible for the air passage. In one example the pressure differential across membrane M3 is about 0.5 to 0.75 psi, however, the present invention is not limited to this pressure range and could be in any range as long as the air passage and extraction occurs.
   (ii) Membrane M3 acts as a barrier between plate P21 and plate P22.

Air passes through membrane M3 to plate P21 and is vented out from plate P21 as c01. The water vapor in stream c0 condenses to liquid water due to the phenomena of over-saturation. The permeation of air across the membrane M3 leads to an increase in the vapor pressure of water vapor in the mixture in P22. This increase in the vapor pressure of water vapor is the driving force for over-saturation and the resultant condensation of water vapor to liquid water. The liquid water thus produced from the separation of air from stream c0 is then pumped by means of a water pump from plate P22 to plate P31 as stream h1, i.e. the water condensate stream. The function of plates P21 and P22 and membrane M3 is essentially to separate and recover water from air in the cathode output stream c0 by utilizing membrane M3. In light of this invention this module is referred to a water management device (see also FIG. 1).

2.2 Compact Multi-functional Module

FIG. 7 shows an example of constructing a compact multi-functional module system for a direct methanol fuel cell system. This design includes various plates, membranes and holes, such as:
   1. Plate P11 with an access hole for a0.
   2. Plates P11, P12 and P21 with a through hole to allow the passage of c0.
   3. Plate P11 with an exit hole for a01.
   4. Plates P12, P21 and P22 with a through hole to allow the passage of a01.
   5. Plate P12 with an exit hole for carbon dioxide ($CO_2$).
   6. Plate P21 with an exit hole for c01.
   7. Plate P22 with an access hole for c0.
   8. Plate P22 with an exit hole for h1.
   9. Plate P31 with an access hole for a01, h1 and a1.
   10. Plate P31 with an exit hole for a11.
   11. Plate P11 with a flow field (e.g. grooved inside face) for flow of a0 and a01.
   12. Plates P12 with a flow field (e.g. grooved inside face) for flow of carbon dioxide ($CO_2$).
   13. Plate P21 with a flow field (e.g. grooved inside face) for flow of c01.
   14. Plate P22 with a flow field (e.g. grooved inside face) for flow of c0 and h1.

EXAMPLE 3

Figure 8:
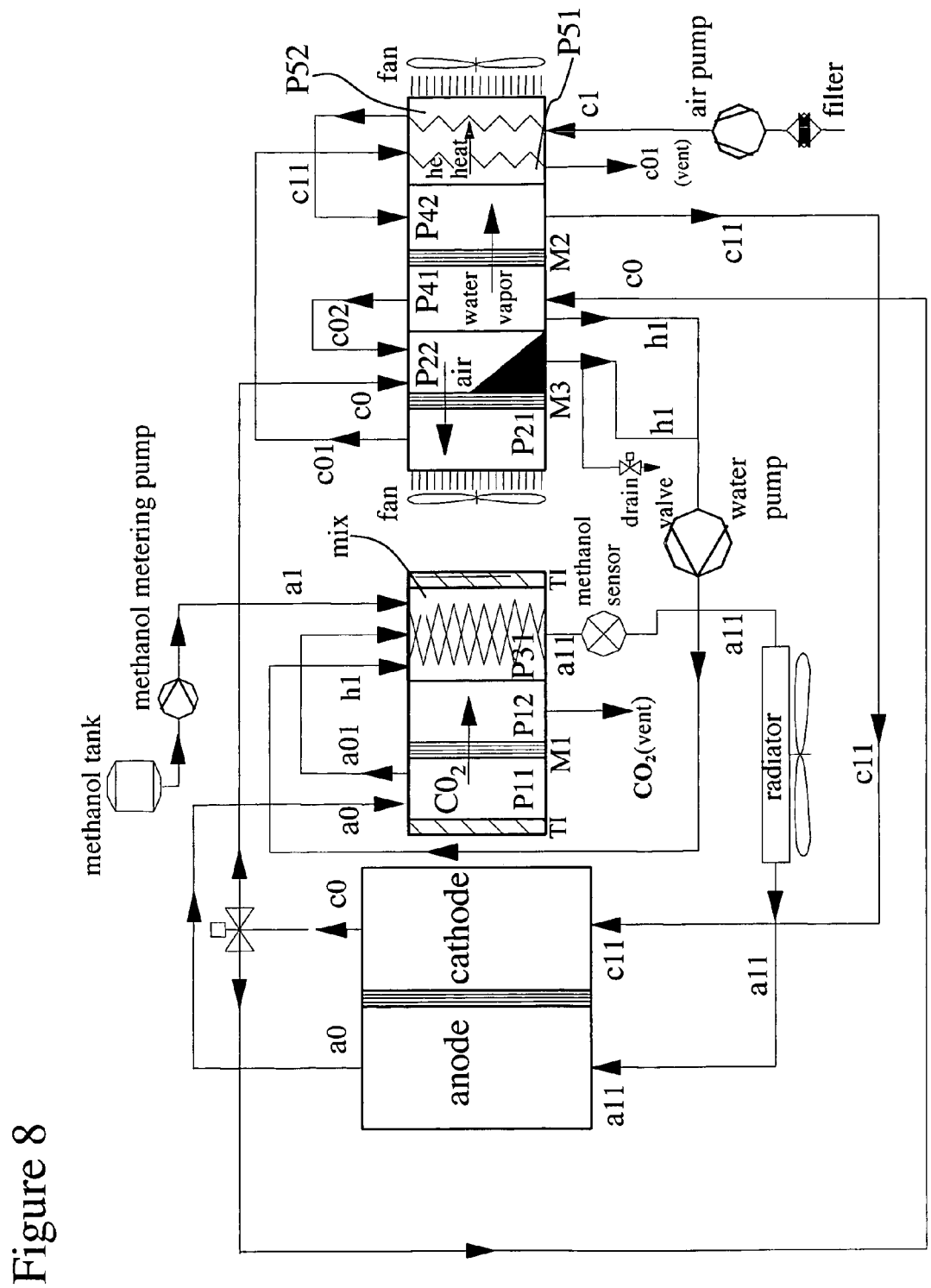
FIG. 8 shows example 3 of DMFC system according to the present invention.

FIGS. 8–9 show yet another example of an approach for implementing the critical functions of water recovery from the cathode exhaust, carbon dioxide separation from the anode output stream, dilution of incoming concentrated methanol and thermal management in a direct methanol fuel cell. This example incorporates aspects of examples 1 and 2. In addition, other variations are added that are described infra. For a description of the other components or modules the reader is referred to the description supra.

3.1 Variations

A first variation relates to the carbon dioxide separation module, which could be stacked with plate P31 that serves as a (passive) mixing device in a similar fashion as in example 1 and 2. In addition, at either side of this compact multi-functional module of plates P11, P12 and P31 thermal insulators TIs could be added to prevent heat loss through radiation from stream a01.

A second variation relates to the water management employing both solutions from example 1 and 2. FIGS. 8–9 show the cathode output stream c0 from direct methanol fuel cell stack (i.e. unused air saturated with water vapor and liquid water at temperatures close to that of the stack) split up into two streams c0 using a flow control valve. A first stream of c0 is fed into plate P41. The combination of plates P41 and plate P42 and membrane M2 is similar to the water management module in example 1. The difference is that plate P23 is omitted in example 3 and the output stream c11 of plate P42 now directly feeds to the cathode input of the direct methanol fuel cell stack. A second stream of c0 is fed into plate P22. The combination of plates P21 and plate P22 and membrane M3 is similar to the water management module in example 2. An additional note is that the air in stream c0 permeates through membrane M3 to plate P21 where and exits as stream c01.

A third variation also relates to the water management module, whereby plate P22 could be cooled to condense the vapor and thus separate the air from the recovered water. Condensation would be a result of cooling provided by forced air-cooling fans as well as a result of over-saturation. Over-saturation would occur since the water vapor pressure in P22 would increase due to the separation of air due to the introduction of c02. The cooling would be particularly beneficial in case a micro-porous hydrophobic type of membrane M3 is used.

A fourth variation relates to humidification and thermal conditioning. Stream c1 is fresh air introduced into the system by means of an air pump into plate P52. Additionally an air filter could be used before entering the air pump. Stream c1 is passed through an air-to-air heat exchanger (plates P51 and P52) where it is thermally conditioned by stream c01 that originates from plate P21. After the thermal conditioning process stream c01 is vented into the atmosphere as c01 (vent). The thermally conditioned stream of air exits as c11 and is passed through plate P42 where it is in contact with membrane M2. Membrane M2 humidifies stream c11 using the water from c0. The thermally conditioned and humidified air stream exits from plate P42 as stream c11 and is introduced into the cathode for the electrochemical reduction reaction. Meanwhile, the dehumidified stream c0 in P41 exits as c02 and is introduced into plate P22. In addition, radiator fans could be used, e.g. at the side of plates P51 and P21 to provide thermal regulation.

3.2 Compact Multi-functional Module

FIG. 9 shows an example of constructing a compact multi-functional module system for a direct methanol fuel cell system. This design includes various plates, membranes and holes, such as:

1. Plate P11 with an access hole for a0.
2. Plate P11 with an exit hole for a01.
3. Plate P12 with a through hole to allow the passage of a01.
4. Plate P12 with a grooved inside face for flow of carbon dioxide ($CO_2$).
5. Plate P31 with an access hole for a01, h1 and a1.
6. Plate P31 with an exit hole for a11.
7. Plate P22 with an access hole for c0.
8. Plate P21 with an access hole for c01.
9. Plates P22 and P41 with an access hole for c0.
10. Plates P22 and P41 with an exit hole for h1.
11. Plate P41 with an exit hole for c02.
12. Plate P22 with an access hole for c02.
13. Plates P22, P41, and P42 with a through hole to allow the passage of c01.
14. Plate P51 with an access hole for c01.
15. Plates P42 and P52 with an exit hole for c11.
16. Plate P51 with an exit hole for c01.
17. Plate P52 with an access hole for c1.
18. Plate P51 with a through hole for c11.
19. Plate P42 with an access hole for c11.
15. Plate P11 with a grooved inside face for flow of a0 and a01.
16. Plates P12 with a flow field (e.g. grooved inside face) for flow of carbon dioxide ($CO_2$).
20. Plate P21 with a flow field (e.g. grooved inside face) for flow of c01.
21. Plate P22 with a flow field (e.g. grooved inside face) for flow of c0, h1 and c02.
22. Plate P41 with a flow field (e.g. grooved inside face) for flow of c0, c02 and h1.
23. Plate P42 with a flow field (e.g. grooved inside face) for flow of c11.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. In one variation, the plates with flow fields for the passage of the fluids could also be designed with fins for an efficient heat transfer mechanism. In another variation, prior to entering the anode of the direct methanol fuel cell stack, stream a11 could be passed through a small radiator for cooling. In yet another variation, the invention could be included in DMFC systems generating 1 kW or more since it would clearly overcome the size and efficiency problems with traditional condensor-based systems in this power range. However, the invention is not limited to such a power range and could also be integrated in DMFC systems of 50 W to 1 kW or, in general, to any type of power range or application. All such variations are considered to be within the scope and spirit of the present invention as defined by the following claims and their legal equivalents.

What is claimed is:

1. An apparatus for carbon dioxide separation in a direct methanol fuel cell system, comprising:
   (a) a membrane permeable to carbon dioxide;
   (b) a first plate and a second plate sandwiched together and enclosing said membrane, wherein said first plate and said second plate are stacked with a direct methanol fuel cell stack;
   (c) wherein said first plate and said second plate each having a flow field at the site facing and in contact with said membrane, wherein said membrane is a barrier between said flow fields;
   (d) wherein said flow field of said first plate has a first hole at one end and a second hole at another end, said first hole providing access for the anode output stream of said direct methanol fuel cell system, said anode output stream comprises at least carbon dioxide, unused methanol and unused water, said second hole providing output for said anode output stream substantially comprising said unused methanol and said unused water; and
   (e) wherein said flow field of said second plate has an exit hole to vent said carbon dioxide that permeated through said membrane.

2. The apparatus as set forth in claim 1, wherein said membrane is substantially restrictive to other gases than said carbon dioxide present in said anode output stream or substantially restrictive to liquids present in said anode output stream.

3. The apparatus as set forth in claim 1, wherein said second hole of said first plate is connected to a fuel mixing device that provides anode inlet fuel for a direct methanol fuel cell stack.

4. The apparatus as set forth in claim 1, wherein said second hole of said first plate continues through said second plate via a through-hole in said second plate.

5. The apparatus as set forth in claim 1, further comprising a through-hole through said first plate and said second plate to connect the cathode output stream of a direct methanol fuel cell stack to a water management device of said direct methanol fuel cell system.

6. The apparatus as set forth in claim 1, further comprising a venting fan.

7. The apparatus as set forth in claim 1, further comprising a mixing device, a water management device, a methanol source, wherein said mixing device has a first input hole connected to said second hole of said first plate, a second input hole for input from said water management device, a third input hole for input from said methanol source, and an output hole to output a mixture of said three inputs, said mixture flows to the anode inlet of a direct methanol fuel cell stack.

8. The apparatus as set forth in claim 1, further comprising a mixing device and a water management device, wherein said mixing device and said water management device comprises one or more plates stacked together with said first plate, said second plate and said direct methanol fuel cell stack.

9. The apparatus as set forth in claim 1, further comprising a mixing device that serves as a thermal regulator.

10. The apparatus as set forth in claim 1, further comprising thermo-insulator layers.

11. The apparatus as set forth in claim 1, further comprising a radiator fan for thermal regulation.

* * * * *